July 29, 1947.　　　　H. C. HAMILTON　　　　2,424,690
SHAFT SEAL
Filed Aug. 24, 1944
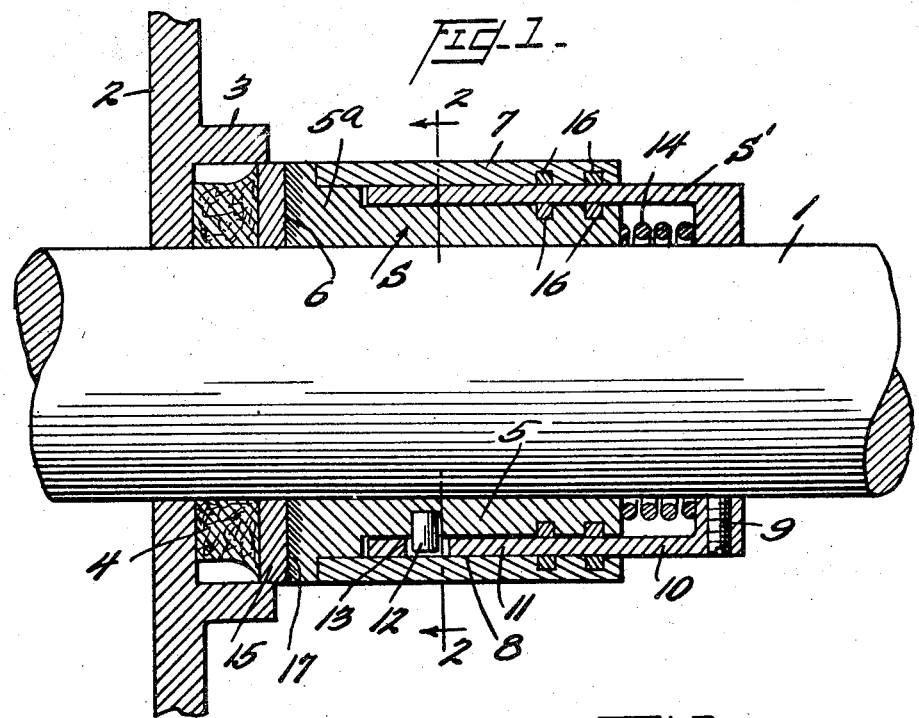
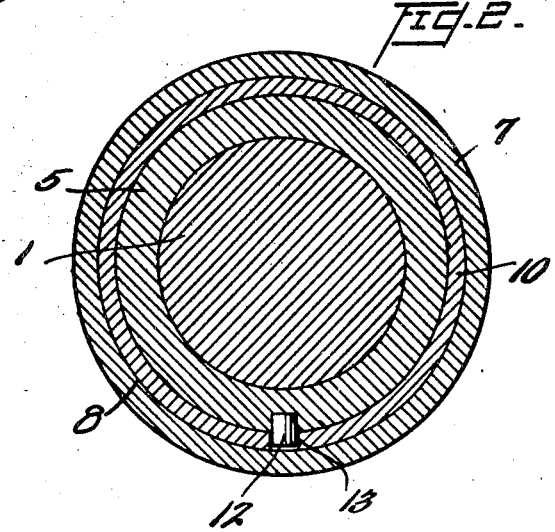
Inventor
Harry C. Hamilton,
By Archibald R. McCallum
Attorney Patented July 29, 1947

2,424,690

UNITED STATES PATENT OFFICE 2,424,690

SHAFT SEAL

Harry C. Hamilton, Compton, Calif.

Application August 24, 1944, Serial No. 550,990

5 Claims. (Cl. 286—7)

1

This invention relates to shaft seals of the class that are adapted to encircle a rotating shaft and close the opening in the wall of a pump or other housing through which the shaft extends.

In the construction of shaft seals of the above character it has heretofore been common practice to tightly pack the shaft adjacent the opening with a compressible material to prevent the flow of fluid along the shaft and through the opening. This form of seal, however, is not entirely satisfactory for the reason that, due to vibration of the rotating shaft and the resulting wear on the packing material, a gap develops between the shaft and the packing which affords a passage for the escape of fluid. This is especially true in the case of centrifugal pumps, turbines and the like where the shaft rotates at high speed and relatively high pressures are developed within the housing. In those cases where springs or other biasing means are provided for exerting a compressive action upon the packing to automatically take up wear the pressure required to maintain the packing in fluid-tight engagement with the shaft results in rapid and excessive wear of the packing and shaft.

An important object of the present invention is to overcome the above objections by providing a telescopic form of shaft seal adapted to encircle and rotate in unison with the shaft and having means for yieldingly urging the seal into flat bearing engagement with a stationary element surrounding the shaft so as to maintain a tight substantial area of contact between the seal and the element which prevents the escape of fluid that may become entrapped within the seal.

Another object of my invention is to provide a shaft seal of the above character in which one of the two telescopic parts is adapted to be fixedly and tightly secured to the shaft and the other part is adapted to snugly embrace the shaft and slide longitudinally thereof under the urge of a spring.

A further object of my invention is to provide a shaft seal of the above character which is especially well suited for sealing the shafts of centrifugal pumps and the like, and which is capable of being readily applied to such shafts.

Still another object of my invention is to provide a shaft seal of the above character which is of such comparatively simple construction as to lend itself to economical manufacture and which is efficient in operation in connection with either liquids or gases and under widely varying temperature conditions.

Other objects and advantages will be apparent from the following detailed description of a preferred embodiment of the invention, reference being had to the annexed drawing in which:

Figure 1 is a view in longitudinal cross-section of a shaft seal; and

Figure 2 is a transverse cross-sectional view of the shaft seal of Fig. 1 taken on the line 2—2.

In the drawing is shown a rotating shaft 1 of a centrifugal pump extending through an opening in a wall 2 of a pump housing. An annular hub 3 projects from the outer face of the housing and defines a pocket for receiving a gasket 4 encircling and hugging the shaft.

The seal generally comprises two telescopically interfitting metal parts S and $S^1$, both arranged for unitary rotation with the shaft, the part $S^1$ being fixed to the shaft 1 and the part S having limited sliding movement longitudinally of the shaft. The part S comprises a cylindrical sleeve 5 snugly encircling the shaft with its inner end face 6 lying in a plane truly perpendicular to the axis of the shaft 1. From a point adjacent the end face 6, the sleeve is of reduced diameter so as to define a barrel portion 5a upon which is shrunk, press-fitted or welded one end of a tubular metal member 7 adapted to form a unitary part of the sleeve 5.

Intermediate the tubular member 7 and the sleeve 5, the sleeve for a substantial portion of its length is further reduced in cross-section so as to provide a recess 8 disposed between the tubular member and sleeve and opening through the outer end of the sleeve. Tightly encircling the shaft 1 and fixed against rotation relative thereto by means of a set screw 9 is the companion part $S^1$ of the seal comprising a cup member 10, the longitudinal wall 11 of which telescopes within and snugly fills the recess 8 except for a slight clearance at the bottom of the recess to permit limited lengthwise movement of the sleeve relative to the cup. In order that the sleeve 5 may partake of the rotation of the cup while at the same time being free to move longitudinally thereof, a dowel 12 projecting outwardly from the circumference of the sleeve is keyed within a slot 13 formed in the wall of the cup and extending a short distance longitudinally thereof.

A coil spring 14 encircling the shaft 1 and held under compression between the outer ends of the cup and the sleeve serves to exert a strong thrust against the sleeve urging its flat end face 6 into tight co-planar engagement with the flat opposing face of a metal bearing ring 15. The ring 15 encircles the shaft and overlies the gasket 4 seated within the annular hub 3.

Since the parts S and S¹ of the seal rotate as a unit with the shaft, no appreciable wear occurs between these parts. However, in order to further seal the telescopic connection between these parts, grooves 16 are provided within the opposed inner and outer circumferences of the tubular member 7 and the sleeve 5, respectively, and these grooves are filled with a suitable packing material, such as rubber or a fibrous composition.

It will be apparent from the foregoing description that substantially the only area of frictional contact lies between the inner end face 6 of the sleeve 5 and the opposed face of the bearing ring 15. These bearing faces are made sufficiently ample in size so as to distribute the wear over a wide area. Advantageously the bearing face 6 of the sleeve is hardened, as indicated at 17, and the ring 15 is made of a soft metal, such as bronze. Thus, the wear is taken almost entirely by the ring which, when it becomes badly worn, may be economically replaced. Because continued rotation of the sleeve on the ring causes the opposed bearing faces to wear smooth and to approach a true co-planar relation, a tight seal under the pressure exerted by the coil spring 14 is insured between these faces so that there is virtually no opportunity for fluid such as may become entrapped within the seal to escape therefrom.

This seal is adaptable to use in butterfly valves as well as shaft cylinder on clay elevators where a liquid is used for cooling head shafts and boot shafts as is practiced in the new 100 octane manufacture.

Manifestly various changes in structure and design may be made in the exemplary form of shaft seal described above without departing from the spirit of my invention as defined by the following claims.

I claim:

1. A seal for rotary shafts comprising a stationary bearing member encircling the shaft, a sleeve adapted to encircle and slidably embrace the shaft, a circular recess extending longitudinally of the sleeve and opening through an end thereof, a cup member having a cylindrical wall slidably fitting within said recess, means for securing the sleeve and cup member to the shaft for unitary rotation therewith, and means yieldingly urging the sleeve lengthwise of the shaft into tight sealing engagement with the bearing member.

2. A seal for rotary shafts comprising a stationary bearing member encircling the shaft, a sleeve adapted to encircle and slidably embrace the shaft, a circular recess extending longitudinally of the sleeve and opening through an end thereof, a cup member having a cylindrical wall telescoping within said recess, means for securing the sleeve and cup member to the shaft for unitary rotation therewith, and a spring interposed between the sleeve and cup member for yieldingly urging the sleeve lengthwise of the shaft into tight sealing engagement with the bearing member.

3. A seal for rotary shafts comprising a stationary bearing member encircling the shaft, a sleeve adapted to encircle and slidably embrace the shaft, a circular recess extending longitudinally of the sleeve and opening through an end thereof, a cup member having a cylindrical wall telescoping within said recess, means tightly and fixedly connecting the cup member to the shaft, means connecting the sleeve to the cup member but permitting limited longitudinal movement of the sleeve relative to the cup member, and a coil spring adapted to encircle the shaft and exert a thrust upon the sleeve to urge the inner end face of the sleeve into tight sealing engagement with the bearing member.

4. A seal for rotary shafts comprising a stationary bearing member encircling the shaft, a sleeve adapted to encircle and slidably embrace the shaft, a circular recess extending longitudinally of the sleeve and opening through the outer end thereof, a cup member having a cylindrical wall telescoping within said recess, means for securing the sleeve and cup member to the shaft for unitary rotation therewith, a spring interposed between the sleeve and cup member for yieldingly urging the sleeve lengthwise of the shaft into tight sealing engagement with the bearing member, and a packing member within the recess in sealing engagement with the wall of the cup member.

5. A seal for rotary shafts comprising a stationary bearing ring encircling the shaft, a sleeve adapted to encircle and slidably embrace the shaft, a tubular member secured to the circumference of the sleeve and providing a cylindrical recess therebetween extending longitudinally of the sleeve and opening through the outer end of the sleeve, a cup member having its outer end adapted to tightly grip the shaft, said cup member having a cylindrical wall telescoping within said recess, means connecting the sleeve with the cup member but permitting limited longitudinal movement with respect thereto, a coil spring adapted to encircle the shaft and to exert a thrust upon the sleeve to urge it lengthwise with its inner end in tight sealing engagement with the bearing ring, and packing members within the recess in sealing engagement with the sleeve and the wall of the cup member, the inner face of the sleeve providing a substantial area of flat contact with the sealing ring and being hardened.

HARRY C. HAMILTON.

REFERENCES CITED

The following references are of record in the file of this patent:

UNITED STATES PATENTS

| Number | Name | Date |
|---|---|---|
| 475,436 | Cedervall | May 24, 1892 |
| 1,926,007 | Kohler | Sept. 5, 1933 |
| 2,237,494 | McCormack | Apr. 8, 1941 |
| 2,249,188 | Stevenson | July 15, 1941 |

FOREIGN PATENTS

| Number | Country | Date |
|---|---|---|
| 528,456 | Great Britain | 1940 |